(No Model.)

A. GIESECKE & H. HAMLIN.
COMPOSITE CORN SIRUP.

No. 253,920. Patented Feb. 21, 1882.

Witnesses.
George H. Sonneborn.
W. H. Sonneborn.

Inventors
Adolph Giesecke
Harry Hamlin
By John R. Bennett
atty

UNITED STATES PATENT OFFICE.

ADOLPH GIESECKE AND HARRY HAMLIN, OF BUFFALO, NEW YORK; SAID GIESECKE ASSIGNOR TO SAID HAMLIN.

COMPOSITE CORN-SIRUP.

SPECIFICATION forming part of Letters Patent No. 253,920, dated February 21, 1882.

Application filed January 5, 1882. (No model.)

*To all whom it may concern:*

Be it known that we, ADOLPH GIESECKE, a subject of the Emperor of Germany, and HARRY HAMLIN, a citizen of the United States, both residing in the city of Buffalo, in the county of Erie and State of New York, have made an invention of a new and useful Article of Manufacture of Composite Corn-Sirup; and I do hereby declare that the following is a full, clear, and exact description and specification thereof.

Compound sirups of corn-sirup or glucose and cane-sirups or molasses have been manufactured previous to our invention in two general modes. According to one mode the two ingredients have been mixed with one or both of them in a sufficiently-diluted condition to permit mixture to be filtered through boneblack filters, after which the dilute filtered mixture has been concentrated to the requisite consistency in the vacuum-pan. According to the other mode the ingredients have been mixed in a concentrated condition at about the ordinary atmospheric temperature. Compound sirups made according to the first mode are objectionable because they lack flavor, being what is technically termed "flat," this defect being due in our opinion to the action of the bone-black and to the concentration subsequent to mixture. Compound sirups made according to the second mode possess, when first made, a desirable flavor, but are objectionable because they speedily become cloudy and lose their brightness of color. Their lasting qualities also become impaired; and these defects are due, in our opinion, to a chemical reaction which takes place between some of the constituents of the two ingredients.

Our invention consists of a new quality or kind of composite corn-sirup which has and retains the desired piquancy of flavor, and possesses also the desired brilliancy and lasting qualities, our invention being based upon a discovery that when the mixture of corn and cane sirups is subjected to heat and agitation the impurities of cane-sirup are rapidly precipitated, and may then be separated from the mixture by filtration, provided the sulphate of lime usually present in unfiltered glucose, or some substitute therefor, be present in the mixture.

Figure 1:
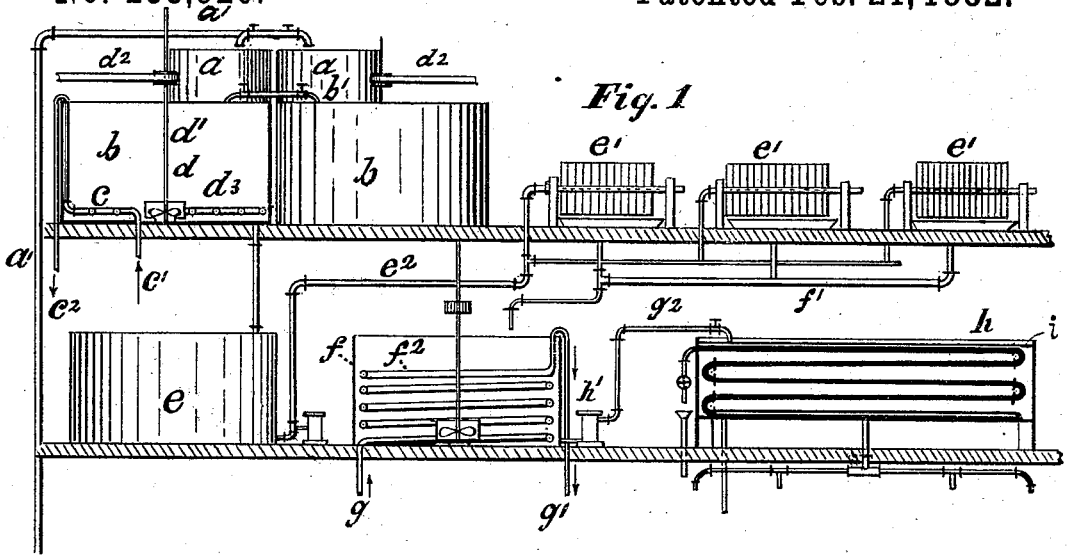
Figure 2:
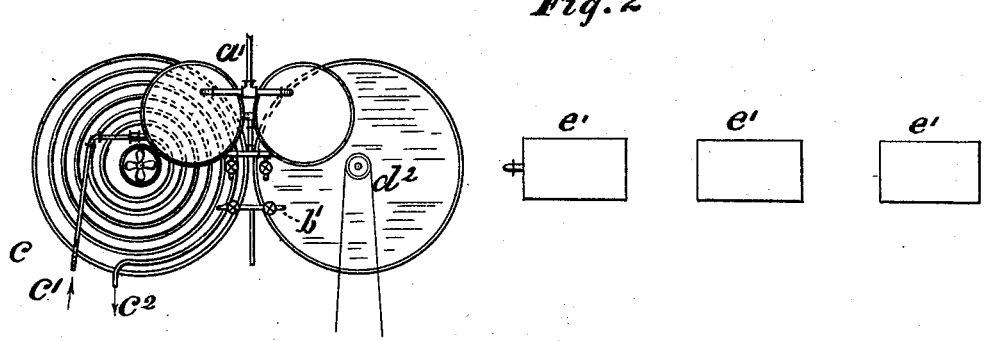
Figure 3:
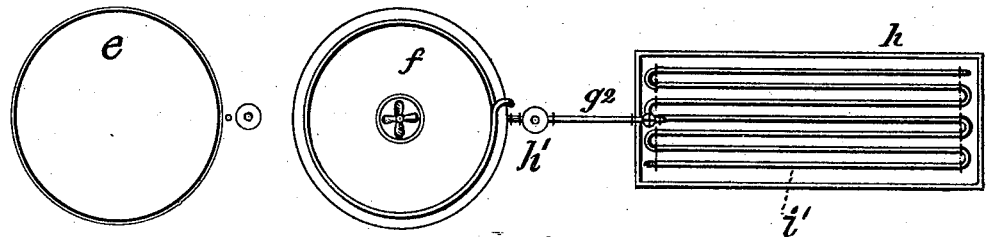
Figure 4:
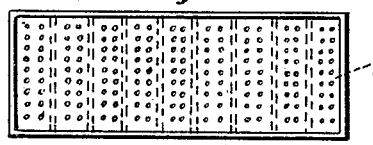

The drawings represent a suitable apparatus for producing our new manufacture of composite corn-sirup. Figure 1 thereof is a section through the floors of a building, showing a side elevation of the apparatus complete, one of the mixing-tanks, the regulating-tank, and a box-cooler being shown in section. Fig. 2 is a plan view of the apparatus on the upper section of floor, one of the mixing-tanks being represented as full of sirup and the other empty, so as to show the heating-coil of steampipe and an agitating or mixing wheel at the bottom of the tank. Fig. 3 is a top view of that portion of the apparatus arranged on the lower floor, showing the receiving-tank, the regulating-tank, and the box-cooler having its perforated top removed; and Fig. 4 is a plan of the box-cooler having its perforated top in place.

In the manufacture of our new article we make use of unfiltered glucose, by which we mean glucose from which the sulphate of lime produced in its manufacture has not been separated by filtration. The unfiltered glucose is put into the mixing-tanks $b$ through the pipes $b'$, and the desired quantity or percentage of cane-sirup is drawn into the mixing-tanks from the measuring-tanks $a$. (Shown in Figs. 1 and 2.) The measuring-tanks $a$ are supplied with cane-sirup through a pipe, $a'$. When the cane-sirup and unfiltered glucose are put into the mixing-tanks $b$ they are thoroughly agitated and mixed together by the revolving wheel $d$, receiving its movement from the vertical shaft $d'$ and belt and pulley $d^2$, or other suitable agitating device, which produces a current in the sirup sufficient to cause it to come in contact with the hot coil of steampipe $c$, adapted to receive a current of steam through them from $c'$ to $c^2$, they being connected in any suitable and well-known way to pipes connected with a steam-boiler, by means of which the temperature of the mixture is raised to from 160° to 190° Fahrenheit, depending upon the conditions of the materials.

The mixed cane-sirup and unfiltered glucose is next conducted to the receiving-tank $e$, and is forced from thence in its heated condition to and through the filters $e'$ through the pipes $e^2$. As the receiver $e$ is used for convenience when large quantities of corn-sirup are made, it may in some cases be dispensed with, in which case the sirup may be conducted directly from the mixing-tank to the filters. The filters which we prefer to use are made in the ordinary way, and consist of a series of grooved plates with the usual cloths and perforated diaphragms, fastened together in the usual manner. As such filters are well known for similar purposes, a minute description of them is unnecessary. From the filters the corn-sirup is conducted to the regulating-tank $f$ (see Figs. 1 and 3) through the pipe $f'$ and its connections. In this tank the sirup is agitated and made to circulate around the cooling-coil $f^2$, which coil is supplied with cold water, passing in at $g$ and out at $g'$, so that the cold water passes through the tank from the bottom of the tank upward, the end $g$ of the coil being connected in any well-known way with a pipe leading from a pump or other well-known water-forcing device.

The color of the compound sirup may, if necessary, be adjusted in the regulating-tank. Thus, if the color be too light to suit the trade, a small portion of cane-sirup or of caramel may be added; and a small portion of glucose or of a light-colored cane-sirup will correct the color if it be too dark. From the regulating-tank the sirup is conducted through the pipe $g^2$ or any other suitable arrangement of pipes to the box-cooler $h$, where it passes through the perforated top $i$, from which it passes in a finely-divided state to and down around the cooling-coils $i'$, which coils are supplied with cold water passing in at the bottom and out from the top of the coil.

With the apparatus arranged as represented in the drawings a pump, $h'$, is required to force the corn-sirup to the box-cooler; but if the latter be arranged on a floor below the regulating-tank, the pump may be dispensed with. The contact of the sirup with the cold-water pipes cools it rapidly, and the sirup, after passing through this box-cooler, is sufficiently cool to be drawn off into barrels.

We do not wish to be understood as restricting the invention to the exact manipulation hereinbefore set forth, as the sirups may be mixed in other ways without departing from the principle of our invention, provided the mixture be subjected to the required amount of heat and agitation. Thus the cane-sirup may be introduced into the vacuum-pan in which the glucose is concentrated, and there mixed with glucose when it has been boiled down to a proper consistency. This may be accomplished in the following manner: The draw-in pipe, through which the glucose is introduced into the vacuum-pan, is connected with another pipe leading into a tank containing any desired measured quantity of cane-sirup. After the boiling of the glucose is completed and before the vacuum is taken off, the valves in the pipe are opened and the cane-sirups drawn into the pan. The steam is kept turned on in the pan, and, if necessary, the boiling operation can be continued until a sufficient agitation and mixture of the sirups are effected. The mixture can then be passed through the form of filter shown in the drawings, or through bag-filters, as may be deemed desirable.

In practicing the process as above set forth we have found that the sulphate of lime present in the mixture of sirups is deposited upon the filter-cloths, and that it appears to be an important factor in the precipitation of the impurities of the cane-sirup and in the operation of filtration. Hence the glucose should either be used in an unfiltered condition, so that sulphate of lime may be present in the mixture to be filtered, or, if filtered glucose be used, some ingredient or ingredients which will act as a substitute for the sulphate of lime should be incorporated in the mixture previous to filtration. The temperatures above mentioned (160° to 190° Fahrenheit) are those which we have used with success. Thus, if a light-colored sirup is to be manufactured, we find it expedient to heat the mixture of sirups to 160° Fahrenheit, and when a dark-colored sirup is to be manufactured we find it expedient to heat the mixture up to 190° Fahrenheit, as the higher the heat the greater the facility of filtering the mixture. The time required for the application of heat and agitation will of course depend upon the circumstances of each particular case. With ordinary cane-sirup as now sold in the market we have found by practice that the two sirups may be mixed with advantage in the proportions of one part of cane-sirup to ten parts of corn-sirup, and that a mixture of about thirty-five hundred gallons of the two sirups can be heated up to a temperature of 160° Fahrenheit, with the requisite agitation, in about an hour, with a precipitation of practically all the matter that would otherwise tend to render the mixture cloudy, and that the mixture can then be drawn from the mixing-tanks and subjected to filtration.

Although the above-mentioned proportions, temperature, and time for subjecting the mixture to the heat and agitation have given the best results, we do not wish to be understood as restricting the invention to them, as we have found that good results may be attained at lower and higher temperatures, and with a more prolonged treatment by heat and agitation, and with other proportions of the ingredients than those above named.

The composite corn-sirup obtained by the above-described process is the new article of manufacture produced by us, and it is distinguished from the compound corn and cane sirups hitherto manufactured by possessing the piquancy of flavor desired by the trade, combined with a lasting brilliancy of color, it being free from the tendency to become cloudy and otherwise depreciated by age.

The process and apparatus hereinbefore set forth have been made the subject of a separate application for a patent. Hence we do not claim them in this patent; but

We claim as our invention—

As a new article of manufacture, the composite corn-sirup hereinbefore set forth.

Witness our hands this 29th day of December, A. D. 1881.

ADOLPH GIESECKE.
HARRY HAMLIN.

Witnesses:
H. W. HAMLIN,
W. H. THORNTON.